United States Patent [19]

Okaniwa et al.

[11] Patent Number: 5,773,532

[45] Date of Patent: Jun. 30, 1998

[54] PROCESS FOR PRODUCING A POLYORGANOSILOXANE-BASED THERMOPLASTIC RESIN

[75] Inventors: Motoki Okaniwa; Norifumi Sumimoto; Yoshihisa Ohta; Nobuo Kawahashi; Kazuki Iwai, all of Yokkaichi, Japan

[73] Assignee: Japan Synthetic Rubber Co., Ltd., Tokyo, Japan

[21] Appl. No.: 784,960

[22] Filed: Jan. 16, 1997

Related U.S. Application Data

[63] Continuation of Ser. No. 545,210, Oct. 19, 1995, abandoned.

[30] Foreign Application Priority Data

Nov. 4, 1994 [JP] Japan .................................. 6-295625

[51] Int. Cl.$^6$ .................................................. C08F 283/00
[52] U.S. Cl. ................................... 525/479; 524/837
[58] Field of Search ............................ 525/479; 524/837

[56] References Cited

U.S. PATENT DOCUMENTS

| | | | |
|---|---|---|---|
| 2,958,707 | 11/1960 | Warrick . | |
| 3,555,109 | 1/1971 | Getson | 525/479 |
| 3,694,478 | 9/1972 | Adams et al. | 525/479 |
| 3,776,875 | 12/1973 | Getson | 525/479 |
| 3,898,300 | 8/1975 | Hilliard | 525/479 |
| 3,932,555 | 1/1976 | Goodrich et al. | 525/479 |
| 4,071,577 | 1/1978 | Falender et al. | 525/479 |
| 4,368,290 | 1/1983 | Alberts et al. | 525/479 |
| 4,690,986 | 9/1987 | Sasaki | 525/479 |
| 4,894,415 | 1/1990 | Sasaki et al. | 525/479 |
| 4,962,165 | 10/1990 | Bortnick | 525/479 |
| 5,147,947 | 9/1992 | Yamamoto et al. . | |
| 5,218,014 | 6/1993 | Matsumoto et al. . | |
| 5,250,615 | 10/1993 | Yamamoto et al. . | |
| 5,274,053 | 12/1993 | Kurata et al. . | |

FOREIGN PATENT DOCUMENTS

| | | |
|---|---|---|
| 351 261 | 7/1979 | Austria . |
| 0 539 901 | 5/1993 | European Pat. Off. . |
| 1 329 751 | 9/1973 | United Kingdom . |

*Primary Examiner*—Melvyn I. Marquis
*Attorney, Agent, or Firm*—Oblon, Spivak, McClelland, Maier & Neustadt, P.C.

[57] ABSTRACT

A process for producing a polyorganosiloxane-based thermoplastic resin which comprises graft polymerizing (3) at least one vinyl monomer using (4) an initiator which is an organic peroxide which, upon decomposition, produces an organic radical represented by the structural formula:

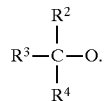

wherein $R^2$, $R^3$ and $R^4$ represent independently hydrogen atoms or alkyl groups having 1 to 10 carbon atoms, in the presence of (2) a polyorganosiloxane.

13 Claims, No Drawings

PROCESS FOR PRODUCING A POLYORGANOSILOXANE-BASED THERMOPLASTIC RESIN

This application is a continuation of application Ser. No. 08/545,210, filed on Oct. 19, 1995, now abandoned.

BACKGROUND OF THE INVENTION

This invention relates to a process for producing a polyorganosiloxane-based thermoplastic resin, and more particularly to a process for producing a polyorganosiloxane-based thermoplastic resin which is particularly excellent in weather resistance and is also good in other physical properties such as slidability, abrasion resistance, impact resistance and the like.

In order to improve the impact strength of a thermoplastic resin, a technique has heretofore been established for modifying the thermoplastic resin with a rubber.

There have been known, for example, an ABS resin in which a styrene-acrylonitrile resin (AS resin) is reinforced with a butadiene rubber, an AAS resin in which an AS resin is reinforced with an acrylic rubber, and the like. As such a base rubber component, a silicone rubber is considered; however, the simple compounding of a polyorganosiloxane with a thermoplastic resin cannot impart a sufficient impact strength to the resulting compound because the compatibility between the two components is insufficient. Therefore, a technique for grafting a vinyl monomer on a rubber as in an ABS resin is required; however, in general, the polyorganosiloxane is poor in reactivity with a vinyl monomer and hence it is difficult to graft copolymerize the vinyl monomer on the polyorganosiloxane. Various methods have been disclosed for forming such graft copolymers. For example, Japanese Patent Application Kokai No. 50-109,282 proposes polymerizing a vinyl monomer in the presence of a polyorganosiloxane having a vinyl group or an allyl group to form a graft copolymer, thereby improving the impact strength of the vinyl resin.

In this case, however, the unreacted vinyl or allyl group remaining in the graft copolymer results in a deterioration of weather resistance, and it has been difficult to keep, or rather enhance, the slidability, abrasion resistance and impact resistance which are the characteristic features of polyorganosiloxane without sacrificing the weather resistance. Moreover, a graft-cross-linking agent for introducing a vinyl group or an allyl group into a polyorganosiloxane is expensive and hence the use of the crosslinking agent is disadvantageous in that the production cost is increased.

SUMMARY OF THE INVENTION

This invention has been made to solve the above prior art problems and aims at providing a process for producing a polyorganosiloxane-based thermoplastic resin which is particularly excellent in weather resistance and is also good in other physical properties such as slidability, abrasion resistance, impact resistance and the like.

According to this invention, there is provided a process for producing a polyorganosiloxane-based thermoplastic resin, which comprises graft polymerizing (3) at least one vinyl monomer using (4) an initiator which is an organic peroxide which, upon decomposition, produces an organic radical represented by the structural formula (I):

wherein $R^2$, $R^3$ and $R^4$ represent independently hydrogen atoms or alkyl groups having 1 to 10 carbon atoms, in the presence of (2) a polyorganosiloxane.

DETAILED DESCRIPTION OF THE INVENTION

The monomer used in synthesizing the polyorganosiloxane (2) includes, for example, (1) an organosiloxane having a structural unit represented by the general formula (II):

in which $R^1$ represents a substituted or unsubstituted monovalent hydrocarbon group and n represents an integer of 0 to 3, and a graft-cross-linking agent which may be used in such an amount that the performance aimed at is not deteriorated.

The organosiloxane (1) used in this invention has a structural unit represented by the above-mentioned general formula (II), and has a straight chain structure, a branched structure or a cyclic structure, and is preferably the organosiloxane having a cyclic structure.

The substituted or unsubstituted monovalent hydrocarbon group possessed by the organosiloxane (1) includes, for example, methyl, ethyl, propyl and phenyl groups; halogen atom-substituted methyl, ethyl, propyl; cyano group-substituted methyl, ethyl, propyl; and the like.

Specific examples of the organosiloxane (1) include cyclic organosiloxanes such as hexamethylcyclotrisiloxane, octamethylcyclotetrasiloxane, decamethylcyclopentasiloxane, dodecamethylcyclohexasiloxane, trimethyltriphenylcyclotrisiloxane and the like and also include straight chain organosiloxanes and branched organosiloxanes.

The amount of the graft-cross-linking agent used is preferably 10 parts by weight or less, more preferably 5 parts by weight or less, per 100 parts by weight of the organosiloxane (1). However, it is particularly preferable that no graft-cross-linking agent is used. When the graft-cross-linking agent is used, the larger the amount thereof, the smaller the molecular weight of the grafted vinyl polymer becomes, and as a result thereof, a sufficient impact strength is not obtained. In addition, weather resistance is also deteriorated because of the presence of unreacted double bond. Accordingly, when no graft-cross-linking agent is used, the polyorganosiloxane-based thermoplastic resin of this invention has better weather resistance. In addition, no process for introducing an expensive graft-cross-linking agent, the production process of which is complex, is needed. Therefore, the objective graft copolymer can be obtained at a low cost.

The graft-cross-linking agent includes specifically p-vinylphenylmethyldimethoxysilane, 1-(m-vinylphenyl)methyldimethylisopropoxysilane, 2-(p-vinylphenyl)ethylmethyldimethoxysilane, 3-(p-vinylphenoxy)propylmethyldiethoxysilane, 3-(p-vinylbenzoyloxy)propylmethyldimethoxysilane, 1-(o-vinylphenyl)-1,1,2-trimethyl-2,2-dimethoxydisilane, 1-(p-vinylphenyl)-1,1-diphenyl-3-ethyl-3,3-diethoxysiloxane, m-vinylphenyl-[3-(triethoxysilyl)propyl]diphenylsilane, [3-(p-isopropenylbenzoylamino)propyl]phenyldipropoxysilane and the like and mixtures thereof.

The graft-cross-linking agent is preferably p-vinylphenylmethyldimethoxysilane, 2-(p-vinylphenyl)

ethylmethyldimethoxysilane or 3-(p-vinylbenzoyloxy)-propylmethyldimethoxysilane, more preferably p-vinylphenylmethyldimethoxysilane.

In the production of the above polyorganosiloxane (2), a cross-linking agent may be added as a third component for improving the impact resistance of the resin obtained. This cross-linking agent includes trifunctional cross-linking agents such as methyltrimethoxysilane, phenyltrimethoxysilane, ethyltriethoxysilane and the like and tetrafunctional cross-linking agents such as tetraethoxysilane and the like.

Polyorganosiloxane (2) can be produced by emulsifying the organosiloxane (1) or a mixture thereof with the graft-cross-linking agent and the cross-linking agent in water in the presence of an emulsifying agent such as an alkylbenzenesulfonic acid or the like, and thereafter, mixing under shear the resulting emulsion using a homomixer or the like. In some cases, no mechanical mixing is necessary.

Incidentally, this organosiloxane (1) may be a previously condensed polyorganosiloxane having a polystyrene-reduced weight average molecular weight of about 500 to 10,000.

When the organosiloxane (1) is the polyorganosiloxane mentioned above, its molecular terminals may be blocked with, for example, hydroxyl groups, trimethylsilyl groups, dimethylvinylsilyl groups, methylphenylvinylsilyl groups, methyldiphenylsilyl groups or the like.

The polyorganosiloxane-based thermoplastic resin of this invention is obtained by graft polymerizing at least one vinyl monomer (3) on the polyorganosiloxane (2) thus obtained.

The vinyl monomer (3) used in this invention includes, for example, aromatic alkenyl compounds such as styrene, α-methylstyrene, sodium styrenesulfonate and the like; methacrylic acid esters such as methyl methacrylate, ethyl methacrylate, 2-ethylhexyl methacrylate, butyl methacrylate, allyl methacrylate, hydroxyethyl methacrylate, dimethylaminoethyl methacrylate and the like; acrylic acid esters such as methyl acrylate, ethyl acrylate, butyl acrylate and the like; vinyl cyanide compounds such as acrylonitrile, methacrylonitrile and the like; olefins such as ethylene, propylene and the like; conjugated diolefins such as butadiene, isoprene, chloroprene and the like; vinyl acetate; vinyl chloride; vinylidene chloride; triallyl isocyanurate; acrylic acid; methacrylic acid; N-phenylmaleimide; N-cyclohexylmaleimide; maleic anhydride; and the like. These may be used alone or in admixture of two or more.

When a graft-cross-linking agent is not used for obtaining the polyorganosiloxane (2), the graft ratio of the graft copolymer thus obtained is preferably at least 10% by weight, more preferably at least 20% by weight and most preferably at least 40% by weight. Thus, when the graft ratio of the graft copolymer is higher, the interfacial bonding strength between the graft copolymer and the vinyl polymer not directly grafted is increased, and hence, the polyorganosiloxane (2) is uniformly dispersed in the vinyl polymer, thereby obtaining a polyorganosiloxane-based thermoplastic resin having a good appearance and an excellent impact strength.

In the production of the polyorganosiloxane-based thermoplastic resin of this invention, the at least one vinyl monomer (3) is graft polymerized on the polyorganosiloxane (2) by a usual radical polymerization, whereby the polyorganosiloxane-based thermoplastic resin is obtained in the form of a composition containing the graft copolymer.

The radical polymerization is effected according to, for example, emulsion polymerization, bulk polymerization, suspension polymerization or solution polymerization. In this case, when some kinds of radical polymerization initiators are used, the latex of the polyorganosiloxane (2) acidified with the alkylbenzenesulfonic acid as mentioned above is required to be neutralized with an alkali. As this alkali, there may be used, for example, sodium hydroxide, potassium hydroxide, sodium carbonate, sodium hydrogencarbonate, triethanolamine, triethylamine or the like.

The radical polymerization initiator (4) used in this invention is an organic peroxide which, upon decomposition, produces an organic radical represented by the structural formula (I):

wherein $R^2$, $R^3$ and $R^4$ represent independently hydrogen atoms or alkyl groups having 1 to 10 carbon atoms.

The organic peroxide which produces the above organic radical includes, for example, peroxyester type organic peroxides, peroxymonocarbonate type organic peroxides, dialkyl peroxide type organic peroxides, hydroperoxide type organic peroxides, dialkyl peroxalate type organic peroxides and peroxyketal type organic peroxides.

The peroxyester type organic peroxides include t-butyl peroxyacetate, t-butyl peroxyneodecanoate, t-butyl peroxypivalate, t-butyl peroxylaurate, t-butyl peroxystearate, t-butyl peroxybenzoate, di-t-butyl diperoxyisophthalate, t-butyl peroxymaleate, t-butyl peroxyneohexanoate and the like.

The peroxymonocarbonate type organic peroxides include t-butyl peroxy-t-butylmonocarbonate, t-butyl peroxymethylmonocarbonate, t-butyl peroxyethylmonocarbonate, t-butyl peroxy-n-propylmonocarbonate, t-butyl peroxyallylmonocarbonate and the like.

The hydroperoxide type organic peroxides include t-butyl hydroperoxide, methyl hydroperoxide, ethyl hydroperoxide, n-propyl hydroperoxide and the like.

The dialkyl peroxide type organic peroxides include di-t-butyl peroxide, dimethyl peroxide, t-butyltrimethylsilyl peroxide, 2,5-dimethyl-2,5-bis(t-butylperoxy)hexen-3, diethyl peroxide, di-n-propyl peroxide, t-butylmethyl peroxide, t-butylethyl peroxide, t-butyl-n-propyl peroxide, methylethyl peroxide, methyl-n-propyl peroxide, ethyl-n-propyl peroxide and the like.

The peroxyketal type organic peroxides include 1,1-bis(t-butylperoxy)-cyclohexane, 2,2-bis(t-butylperoxy)butane and the like.

The dialkyl peroxylate type organic peroxides include di-t-butyl peroxalate, dimethyl peroxalate, t-butyltrimethylsilyl peroxalate, dimethyl peroxalate, diethyl peroxalate, di-n-propyl peroxalate, t-butylmethyl peroxalate, t-butylethyl peroxalate, t-butyl-n-propyl peroxalate, methylethyl peroxalate, methyl-n-propyl peroxalate, ethyl-n-propyl peroxalate and the like.

The organic peroxides are used in the form of a thermally dissociating system or in the form of a redox system which is a combination of the organic peroxide and a reducing agent such as a dextrose-iron (II)-pyrophosphate composition or a sulfoxylate composition.

With other initiators than the above organic peroxides, a high graft ratio is not obtained, and consequently, the interfacial bonding strength between the polyorganosiloxane and the ungrafted vinyl polymer is reduced. Therefore, a sufficient impact strength is not imparted to the graft copolymer.

When an organic radical represented by the above formula (I) is produced by thermal dissociation of the organic peroxide, the organic peroxide preferably includes dialkyl peroxide type organic peroxides, dialkyl peroxalate type organic peroxides and peroxyketal type organic peroxides.

When an organic radical represented by the above formula (I) is produced by a redox reaction of the organic peroxide, the organic peroxides preferably have asymmetric structure with an O—O linkage having biased electric charge, and include peroxyester type organic peroxides, peroxymonocarbonate type organic peroxides, hydroperoxide type organic peroxides and peroxyketal type organic peroxide.

The amount of the initiator used is preferably 0.01 to 10 parts by weight, more preferably 0.1 to 5 parts by weight, per 100 parts by weight of the polyorganosiloxane (2) and when the amount is less than 0.01 part by weight, the vinyl monomer conversion is low and the amount of the unreacted vinyl monomer becomes large. Also, when the amount exceeds 10 parts by weight, the organic peroxide remaining after the reaction induces the thermal decomposition of the polymer when the polyorganosiloxane-based thermoplastic resin is kneaded and the impact strength becomes low.

In this case, it is preferable to carry out the radical polymerization according to an emulsion polymerization or a solution polymerization, and the emulsion polymerization is more preferable because the emulsion polymerization is hardly affected by the chain transfer reaction of the polymerization solvent.

In the emulsion polymerization, a known emulsifier, the above-mentioned radical initiator, a chain transfer agent and the like are used.

Here, as the emulsifier, there are used anionic emulsifiers such as sodium dodecylbenzenesulfonate, sodium laurylsulfate, sodium diphenyl ether disulfonate, sodium dialkyl succinate sulfonate and the like; or nonionic emulsifiers such as polyoxyethylene alkyl ester, polyoxyethylene alkyl aryl ether and the like, and these emulsifiers may be used alone or in admixture of two or more.

The amount of the emulsifier used is preferably about 0.5 to 5% by weight based on the weight of the at least one vinyl monomer (3).

As the chain transfer agent, a mercaptan such as t-dodecylmercaptan, octylmercaptan, n-tetradecylmercaptan, n-hexylmercaptan or the like; or a halogen compound such as carbon tetrachloride, ethylene bromide or the like is used in an amount of preferably not more than 1% by weight, most preferably 0% by weight, based on the weight of the vinyl monomer (3).

In the emulsion polymerization, if necessary, various electrolytes, a pH adjuster and the like can be used in combination with the radical polymerization initiator, the emulsifier, the chain transfer agent and the like, and usually, 100 parts by weight of the at least one vinyl monomer (3) is emulsion-polymerized in the presence of 100 to 500 parts by weight of water and the above-mentioned amounts of the radical polymerization initiator, the emulsifier, the chain transfer agent and the like at a polymerization temperature of 5° to 150° C., preferably 50° to 140° C., for a polymerization period of 0.1 to 10 hours.

Incidentally, in the case of the emulsion polymerization, the at least one vinyl monomer (3) and the radical polymerization initiator are added to a latex containing the polyorganosiloxane (2) obtained by condensing the organosiloxane (1) to carry out the emulsion polymerization.

On the other hand, in the case of the solution polymerization, the polyorganosiloxane (2) and the at least one vinyl monomer (3) are dissolved in an organic solvent and to the solution are added the radical polymerization initiator and, if necessary, the chain transfer agent and various additives, after which the radical polymerization is carried out.

The organic solvent used in the solution polymerization includes toluene, n-hexane, cyclohexane, chloroform, tetrahydrofuran and the like.

In the solution polymerization, the radical polymerization initiator and, if necessary, a chain transfer agent and the like are used together, and 100 parts of the at least one vinyl monomer (3) is solution-polymerized in the presence of preferably 80 to 500 parts of an organic solvent and the above-mentioned amounts of the radical polymerization initiator, the chain transfer agent and the like at a polymerization temperature of 5° to 150° C., preferably 50° to 130° C., for a polymerization period of 1 to 10 hours.

In the case of the solution polymerization, the amount of impurities can be remarkably reduced as compared with the case of the emulsion polymerization.

The polyorganosiloxane-based thermoplastic resin of this invention, when produced by an emulsion polymerization, is purified by coagulating the emulsion in a conventional coagulation manners, washing the powder obtained with water and then drying the powder.

In the case of the solution polymerization, the polyorganosiloxane-based thermoplastic resin is purified by removing the unreacted monomers and the solvent by steam distillation, finely dividing the resin blocks obtained and then drying the resulting powder.

The polyorganosiloxane-based thermoplastic resin of this invention containing the graft copolymer obtained by the above-mentioned methods can be pelletized by a kneading machine such as an extruder or the like.

In this case, other known polymers may be blended as required for the desired performance with the polyorganosiloxane-based thermoplastic resin of this invention in an appropriate amount within the range of preferably 99% by weight or less, more preferably about 90% by weight or less, based on the weight of the polyorganosiloxane-based thermoplastic resin, and the resulting blend may be used as a thermoplastic resin composition (referred to hereinafter merely as the thermoplastic resin composition).

Such known polymers include, for example, diene rubbers such as polybutadiene, butadiene-styrene copolymer, acrylonitrile-butadiene copolymer, polyisoprene, natural rubber and the like; olefinic rubbers such as acrylic rubber, ethylene-propylene copolymer, ethylene-propylene-diene copolymer, chlorinated butyl rubber, chlorinated polyethylene and the like; aromatic vinyl compound-conjugated diene block copolymers such as styrene-butadiene block copolymer, styrene-butadiene-styrene block copolymer, styrene-butadiene-styrene radial teleblock copolymer and the like; hydrogenated products of these block copolymers; polypropylene; polyethylene; polystyrene; styrene-acrylonitrile copolymer; rubber-reinforced polystyrene (HIPS); acrylonitrile-butadiene-styrene resin (ABS resin), acrylonitrile-ethylene-propylene-styrene resin (AES resin), methyl methacrylate-butadiene-styrene resin (MBS resin), acrylonitrile-butadiene-methyl methacrylatestyrene resin; acrylonitrile-n-butyl acrylate-styrene resin (AAS resin); polyvinyl chloride; polycarbonate; polyethylene terephthalate; polybutylene terephthalate; polyacetal; polyamide; epoxy resin; polyvinylidene fluoride; polysulfone; ethylene-vinyl acetate copolymer; PPS resin; polyetheretherketone; PPO resin; styrene-methyl methacrylate copolymer; styrene-maleic anhydride copolymer; rubber-modified PPO resin; styrene-maleimide copolymer; rubber-modified styrene-maleimide copolymer; polyamide type elastomer; polyester type elastomer; and the like.

The pelletized thermoplastic resin (composition) is processed and molded by a usual means such as compression molding, injection molding or the like.

The polyorganosiloxane-based thermoplastic resin of this invention is particularly excellent in weather resistance and is also good in other physical properties such as slidability, abrasion resistance, impact resistance and the like, and has a wide, excellent performance which has not been obtained by any means from any conventional thermoplastic resin. Accordingly, the polyorganosiloxane-based thermoplastic resin of this invention can be widely applied to a field to which the conventional thermoplastic resin cannot be applied by any means, and hence, the commercial value thereof is very great.

DESCRIPTION OF THE PREFERRED EMBODIMENTS

Examples are shown below to explain this invention in more detail. Incidentally, in the Examples, part and % are by weight unless otherwise specified.

In the Examples, various measurements were conducted by the following methods:

Graft ratio

A definite amount (x) of a graft-polymerized product was poured into acetone, and the resulting mixture was shaken by means of a shaker for 2 hours to dissolve the free copolymer in the acetone and subjected to centrifugal separation using a centrifugal separator at a revolution rate of 23,000 rpm for 30 minutes to obtain insolubles. Subsequently, the insolubles were dried in a vacuum drier at 120° C. for 1 hour, the weight (y) of the insolubles was measured, and the graft ratio was determined from the following equation:

Graft ratio=[(y)−(x)×the fraction of the component (2) in the graft-polymerized product]/[(x)×the fraction of the component (2) in the graft-copolymerized product]×100 (%)

Izod impact strength (notched)

Measured according to ASTM D256 using a ¼-inch test piece at 23° C.

Weather resistance

Izod impact strength was measured after exposure for 200 hours (at 63° C. and showered sometimes) using a sunshine weatherometer (WE-USN-HC, a trade name of Toyo Rika Kabushiki Kaisha).

Sliding characteristics

In the sliding test, a Suzuki-system sliding tester was used and steel (S45C) was used as a counter member. The test piece was a hollow cylinder having an outer diameter of 25.6 mm and an inner diameter of 20.0 mm and the counter member has the same shape.

The conditions for measuring the wear were such that the temperature was room temperature (23° C.), the humidity of the atmosphere was 50%, the load was 5 kg and the running speed was 3.75 cm/sec.

The kinetic friction coefficient was determined by the following equation:

$$\mu=[3\times F\times R\times(r_2^2-r_1^2)]/[P\times(r_2^3-r_1^3)]$$

wherein $\mu$ is a kinetic friction coefficient, F is a force applied to a load cell, P is a load, R is the length of arm up to the load cell, $r_1$ is the inner diameter and $r_2$ is the outer diameter.

The conditions for measuring the friction coefficient were such that the temperature was room temperature 23° C., the humidity of the atmosphere was 50%, the load was 10 kg, the running speed was 15 cm/sec and the revolution rate was 80,000 rpm (running distance: 6 km).

EXAMPLE 1

One hundred parts of octamethylcyclotetrasiloxane [the component (1)] was added to 300 parts of distilled water having dissolved therein 2.0 parts of dodecylbenzenesulfonic acid, and they were stirred for 10 minutes by means of a homomixer to emulsify and finely disperse the octamethylcyclotetrasiloxane in the distilled water.

The resulting mixture was placed in a separable flask equipped with a condenser, a nitrogen-introducing inlet and a stirrer, heated at 90° C. for 6 hours with stirring and then cooled at 35° C. for 5 hours to complete the condensation.

The degree of condensation of octamethylcyclotetrasiloxane in the polyorganosiloxane obtained was 87.9%.

This polyorganosiloxane latex was neutralized to pH 7 with sodium hydrogencarbonate, and 35 parts (as solids) of the polyorganosiloxane latex was mixed with 0.5 part of sodium dodecylbenzenesulfonate and 140 parts of distilled water, after which the resulting mixture was placed to a separable flask equipped with a dropping funnel, a condenser, a nitrogen-introducing inlet and a stirrer, into which 15.8 parts of styrene corresponding to 34% of the total styrene amount, 6.29 parts of acrylonitrile corresponding to 34% of the total acrylonitrile amount, 0.2 part of sodium pyrophosphate, 0.25 part of grape sugar, 0.004 part of ferrous sulfate and 0.27 part of t-butyl peroxylaurate were charged. The temperature of the resulting mixture was elevated to 70° C. while nitrogen was allowed to flow, at which temperature the mixture was subjected to batch-polymerization. The polymerization reaction was then further conducted for 1 hour and the reaction product was cooled.

30.7 parts of the remaining styrene, 12.21 parts of the remaining acrylonitrile, 1.084 parts of sodium dodecylbenzenesulfonate, 42 parts of distilled water and 0.135 part of t-butyl peroxylaurate were stirred for 5 minutes by means of a homomixer to prepare an emulsified and finely dispersed mixture, and this mixture was added to the above product using the dropping bottle over a period of 3 hours. After completion of the dropwise addition, the mixture was subjected to polymerization reaction for 1 hour, and cooled after completion of the polymerization. The graft copolymer latex obtained was poured into hot water having dissolved therein 2 parts of calcium chloride dihydrate to coagulate. Thereby a thermoplastic resin containing the graft copolymer was separated. This thermoplastic resin was well washed with water and thereafter dried at 80° C. for 24 hours to complete the purification.

Subsequently, 57 parts of the thermoplastic resin powder was mixed with 43 parts of a styrene-acrylonitrile copolymer (AS resin) to prepare a thermoplastic resin composition. This thermoplastic resin composition was extruded using a twin screw extruder at a cylinder temperature of 230° C. to obtain pellets.

The thermoplastic resin composition obtained was excellent in weather resistance, slidability and impact resistance. The evaluation results are shown in Table 1.

EXAMPLE 2

The same procedure as in Example 1 was repeated, except that, in the synthesis of the graft copolymer, 0.55 part of di-t-butyl peroxide was used as the organic peroxide in the batch polymerization, the batch polymerization time was changed to 3 hours and 0.25 part of di-t-butyl peroxide was used in the drop-polymerization, to prepare a thermoplastic resin and the evaluation was conducted in the same manner as in Example 1. The thermoplastic resin composition obtained was excellent in weather resistance, slidability and impact resistance. The evaluation results are shown in Table 1.

EXAMPLE 3

The same procedure as in Example 1 was repeated, except that, in the synthesis of the graft copolymer, 0.059 part of t-butyl hydroperoxide was used as the organic peroxide in the batch polymerization and 0.029 part of t-butyl hydroperoxide was used in the drop-polymerization, to prepare a thermoplastic resin, and evaluation was conducted in the same manner as in Example 1. The thermoplastic resin composition obtained was excellent in weather resistance, slidability and impact resistance. The evaluation results are shown in Table 1.

EXAMPLE 4

The same procedure as in Example 1 was repeated, except that, in the synthesis of the graft copolymer, 0.131 part of t-butyl peroxyacetate was used as the organic peroxide in the batch polymerization and 0.065 part of t-butyl peroxyacetate was used in the drop-polymerization, to prepare a thermoplastic resin, and evaluation was conducted in the same manner as in Example 1. The thermoplastic resin composition obtained was excellent in weather resistance, slidability and impact resistance. The evaluation results are shown in Table 1.

EXAMPLES 5 and 6

The same procedure as in Example 1 was repeated, except that, in the synthesis of the graft copolymer, the kinds and amounts of the vinyl monomers used, and the kind and amount of the resin to be blended were changed as shown in Table 1, to prepare thermoplastic resins and evaluation was conducted in the same manner as in Example 1. The thermoplastic resin compositions obtained were excellent in weather resistance, slidability and impact resistance. The evaluation results are shown in Table 1.

COMPARATIVE EXAMPLE 4

The same procedure as in Example 1 was repeated, except that, in the production of the polyorganosiloxane [the component (2)], the amount of the graft-cross-linking agent was varied, to prepare a polyorganosiloxane (2) and in the preparation of a graft copolymer using this polyorganosiloxane, the kinds and amounts of the vinyl monomers and the kind and amount of the resin to be blended were varied, to prepare a thermoplastic resin, and evaluation was conducted in the same manner as in Example 1. The thermoplastic resin composition obtained was excellent in weather resistance, slidability and impact resistance. The evaluation results are shown in Table 1.

COMPARATIVE EXAMPLE 1

The same procedure as in Example 1 was repeated, except that in the synthesis of the graft copolymer, 0.128 part of diisopropylbenzene hydroperoxide was used as the organic peroxide in the batch polymerization and 0.064 part of diisopropylbenzene hydroperoxide was used as the organic peroxide in the drop-polymerization, to prepare a thermoplastic resin, and evaluation was conducted in the same manner as in Example 1. The evaluation results are shown in Table 1.

COMPARATIVE EXAMPLE 2

The same procedure as in Example 1 was repeated, except that, in the synthesis of the graft copolymer, 0.163 part of cumene hydroperoxide was used as the organic peroxide in the batch polymerization and 0.082 part of cumene hydroperoxide was used as the organic peroxide in the drop-polymerization, to prepare a thermoplastic resin, and evaluation was conducted in the same manner as in Example 1. The evaluation results are shown in Table 1.

COMPARATIVE EXAMPLE 3

The same procedure as in Comparative Example 1 was repeated, except that the amount of the graft-crosslinking agent used was changed as shown in Table 1, to prepare a polyorganosiloxane [the component (2)], and in the preparation of the graft copolymer using this polyorganosiloxane, the kinds and amounts of the vinyl monomers used and the kind and amount of the resin to be blended were varied as shown in Table 1, to prepare a thermoplastic resin, and evaluation was conducted in the same manner as in Example 1. The evaluation results are shown in Table 1.

TABLE 1

|  |  | Example 1 | Example 2 | Example 3 | Example 4 | Example 5 |
|---|---|---|---|---|---|---|
| Compounding recipe in preparing polyorganosiloxane (2) | | | | | | |
| Octamethyltetrasiloxane (1) | (part) | 100 | 100 | 100 | 100 | 100 |
| p-Vinylphenyldimethoxysilane | (part) | | | | | |
| Feed composition in preparing graft copolymer | | | | | | |
| Polyorganosiloxane (2) | (part) | 35 | ← | ← | ← | 40 |
| Vinyl monomer (3) | | | | | | |
| Styrene | (part) | 46.5 | ← | ← | ← | 60 |
| Acrylonitrile | (part) | 18.5 | ← | ← | ← | |
| Methyl methacrylate | (part) | | | | | |
| Organic peroxide | | | | | | |
| t-Butyl peroxylaurate | (part) | 0.405 | | | | 0.405 |
| Di-t-butyl peroxide | (part) | | 0.800 | | | |
| t-Butyl hydroperoxide | (part) | | | 0.088 | | |
| t-Butyl peroxyacetate | (part) | | | | 0.196 | |

TABLE 1-continued

|  |  |  |  |  |  |  |
|---|---|---|---|---|---|---|
| Diisopropylbenzene hydroperoxide | (part) |  |  |  |  |  |
| Cumene hydroperoxide | (part) |  |  |  |  |  |
| Compounding recipe of thermoplastic resin (composition) |  |  |  |  |  |  |
| Polyorganosiloxane-based thermoplastic resin | (part) | 57 | ← | ← | ← | 50 |
| AS resin | (part) | 43 | ← | ← | ← |  |
| Polystyrene resin | (part) |  |  |  |  |  |
| Polymethyl methacrylate | (part) |  |  |  |  | 50 |
| Polystyrene/MMA copolymer (ST/MMA = 70/30: wt. ratio) |  |  |  |  |  |  |
| Evaluation of thermoplastic resin (composition) |  |  |  |  |  |  |
| Graft ratio of graft copolymer | (%) | 75 | 90 | 60 | 57 | 85 |
| Izod impact strength (23° C.) | (J/m) | 149 | 150 | 135 | 165 | 120 |
| Izod impact strength (23° C.) after weathering test | (J/m) | 140 | 145 | 120 | 160 | 110 |
| Kinetic friction coefficient | (J/m) | 0.18 | 0.2 | 0.19 | 0.18 | 0.2 |
| Wear | (mg) | 0.51 | 0.66 | 0.54 | 0.35 | 0.28 |

|  |  | Example 6 | Comparative Example 4 | Comp. Ex. 1 | Comp. Ex. 2 | Comp. Ex. 3 |
|---|---|---|---|---|---|---|
| Compounding recipe in preparing polyorganosiloxane (2) |  |  |  |  |  |  |
| Octamethyltetrasiloxane (1) | (part) | 100 | 98.5 | 100 | 100 | 85 |
| p-Vinylphenyldimethoxysilane | (part) |  | 1.5 |  |  | 15 |
| Feed composition in preparing graft copolymer |  |  |  |  |  |  |
| Polyorganosiloxane (2) | (part) | 30 | 35 | ← | ← | ← |
| Vinyl monomer (3) |  |  |  |  |  |  |
| Styrene | (part) |  | 46.5 | ← | ← | ← |
| Acrylonitrile | (part) |  | 18.5 | ← | ← | ← |
| Methyl methacrylate | (part) | 70 |  |  |  |  |
| Organic peroxide |  |  |  |  |  |  |
| t-Butyl petoxylaurate | (part) | 0.405 | 0.405 |  |  |  |
| Di-t-butyl peroxide | (part) |  |  |  |  |  |
| t-Butyl hydroperoxide | (part) |  |  |  |  |  |
| t-Butyl peroxyacetate | (part) |  |  |  |  |  |
| Diisopropylbenzene hydroperoxide | (part) |  |  | 0.192 |  | 0.192 |
| Cumene hydroperoxide | (part) |  |  |  | 0.245 |  |
| Compounding recipe of thermoplastic resin (composition) |  |  |  |  |  |  |
| Polyorganosiloxane-based thermoplastic resin | (part) | 67 | 67 | 57 | ← | ← |
| AS resin | (part) |  |  | 43 | ← | ← |
| Polystyrene resin | (part) |  |  |  |  |  |
| Polymethyl methacrylate | (part) | 33 |  |  |  |  |
| Polystyrene/MMA copolymer (ST/MMA = 70/30: wt. ratio) |  |  | 33 |  |  |  |
| Evaluation of thermoplastic resin (composition) |  |  |  |  |  |  |
| Graft ratio of graft copolymer | (%) | 65 | 95 | 4 | 2 | 150 |
| Izod impact strength (23° C.) | (J/m) | 100 | 145 | 15 | 14 | 75 |
| Izod impact strength (23° C.) after weathering test | (J/m) | 85 | 85 | 12 | 10 | 35 |
| Kinetic friction coefficient | (J/m) | 0.22 | 0.2 | 0.19 | 0.19 | 0.2 |
| Wear | (mg) | 0.7 | 0.6 | 25 | 50 | 0.8 |

As is clear from Table 1, in this invention (Examples 1 to 6), thermoplastic resins excellent in weather resistance and well balanced in slidability, abrasion resistance and impact resistance are obtained.

On the other hand, in Comparative Examples 1 and 2, diisopropylbenzene hydroperoxide and cumene hydroperoxide which have a benzene ring are used as the initiator, and hence, no graft reaction proceeds, so that the graft ratio is extremely low, and the interfacial bonding strength between the rubber and the matrix phase become extremely low. Therefore, the impact resistance and the abrasion resistance are extremely low.

In Comparative Example 3, the amount of the cross-linking agent used exceeds the upper limit of this invention, and hence, the graft ratio of the graft copolymer obtained is extremely high as compared with Comparative Examples 1 and 2, and hence, entanglement between the graft copolymers is caused and hence the graft copolymers are not microdispersed, whereby the impact resistance is lowered. In addition, since the amount of the remaining double bonds is large, the impact resistance in the weather resistance test is extremely lowered.

What is claimed is:

1. A process for producing a polyorganosiloxane-based thermoplastic resin, which comprises graft polymerizing by emulsion polymerizing (3) a vinyl monomer, using (4) an initiator obtained by a redox reaction of an organic peroxide with a reducing agent, said initiator consisting essentially of the structural formula (I):

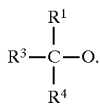

(I)

wherein $R^2$, $R^3$, and $R^4$ represent independently hydrogen atoms or alkyl groups having 1 to 10 carbon atoms, in the presence of (2) a polyorganosiloxane prepared from monomers free of graft-crosslinking groups, wherein said vinyl monomer (3) grafted onto polyorganosiloxane (2) consists of a monomer selected from the group consisting of aromatic alkenyl compounds, alkyl methacrylic acid esters, alkyl acrylic acid esters, vinyl cyanide compounds, and mixtures thereof, wherein:

the methacrylic acid esters are selected from the group consisting of methyl methacrylate, ethyl methacrylate, 2-ethylhexyl methacrylate and butyl methacrylate; and the acrylic acid esters are selected from the group consisting of methyl acrylate, ethyl acrylate and butyl acrylate.

2. The process according to claim 1, wherein the organic peroxide subjected to said redox reaction with a reducing agent has asymmetric structure with O—O linkage having biased electric charge, and which is selected from the group consisting of peroxyester organic peroxides, peroxymonocarbonate organic peroxides, hydroperoxide organic peroxides and peroxyketal organic peroxides.

3. The process according to claim 1, wherein the amount of the initiator (4) used is 0.01 to 10 parts by weight per 100 parts by weight of the polyorganosiloxane (2).

4. The process according to claim 1, wherein the polyorganosiloxane (2) is an organosiloxane having a structural unit represented by the formula (II):

$$R^1{}_n SiO_{(4-n)/2}$$ (II)

wherein $R^1$ represents a halogen or cyano monovalent hydrocarbon group free of graft-crosslinking groups and n represents an integer of 0 to 3.

5. The process according to claim 1, wherein the polyorganosiloxane is a cyclic organosiloxane.

6. The process according to claim 4, wherein $R^1$ in the formula (II) representing the structural unit of the organosiloxane is selected from the group consisting of methyl, ethyl, propyl, butyl and phenyl groups, halogen atom-substituted methyl, ethyl, propyl, butyl and phenyl groups and cyano group-substituted methyl, ethyl, propyl and phenyl groups.

7. The process according to claim 4, wherein the organosiloxane is hexamethylcyclotrisiloxane.

8. The process according to claim 1, wherein the at least one vinyl monomer (3) is a mixture consisting of 65 to 75% by weight of styrene and 35 to 25% by weight of acrylonitrile.

9. The process according to claim 1, wherein the graft ratio of the monomer (3) to polyorganosiloxane (2) is at least 10% by weight.

10. The process according to claim 1, wherein the graft ratio of the monomer (3) to polyorganosiloxane (2) is at least 20% by weight.

11. The process according to claim 4, wherein the organosiloxane is octamethylcyclotetrasiloxane.

12. The process according to claim 1, $R^2$, $R^3$ and $R^4$ in the formula (I) are alkyl groups having 1 carbon atom.

13. The process according to claim 1, wherein the aromatic alkenyl compound is selected from the group consisting of styrene and α-methylstyrene; and the vinyl cyanide compound is acrylonitrile.

* * * * *